D. F. OLIVER, DEC'D.
L. F. OLIVER, EXECUTRIX.
VEHICLE TOP.
APPLICATION FILED FEB. 15, 1917.
1,294,148.
Patented Feb. 11, 1919.
2 SHEETS—SHEET 2.
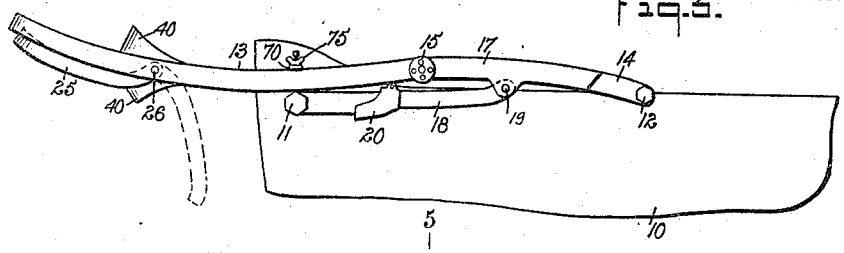
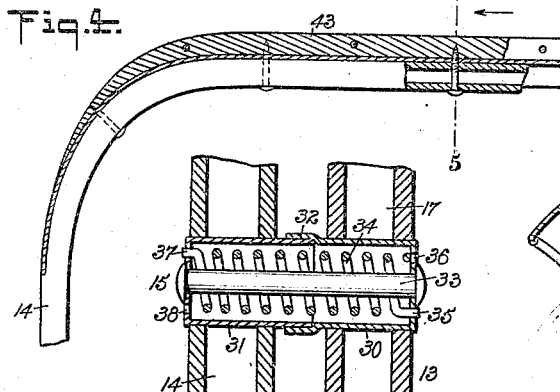
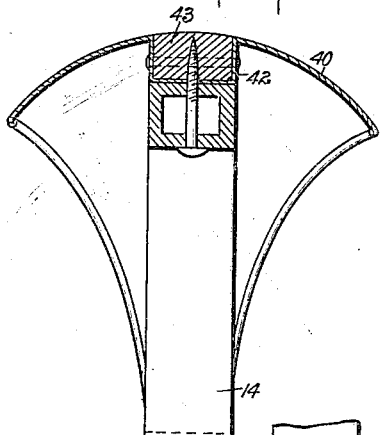
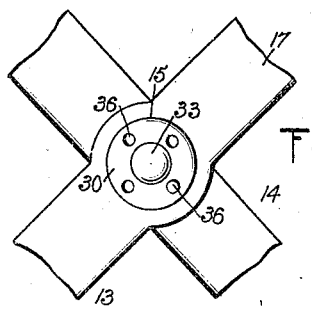
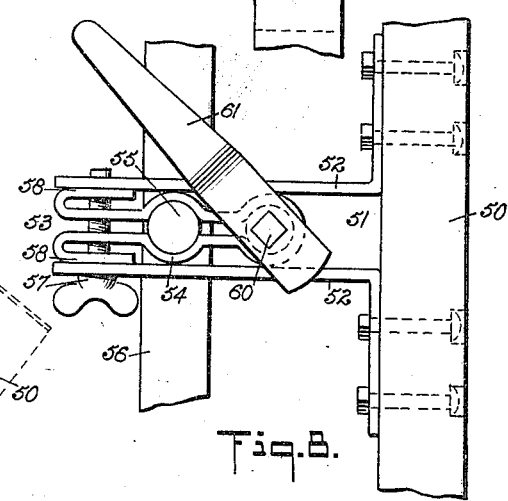
WITNESSES
INVENTOR
Doctor F. Oliver
BY
ATTORNEYS D. F. OLIVER, DEC'D.
L. F. OLIVER, EXECUTRIX.
VEHICLE TOP.
APPLICATION FILED FEB. 15, 1917.

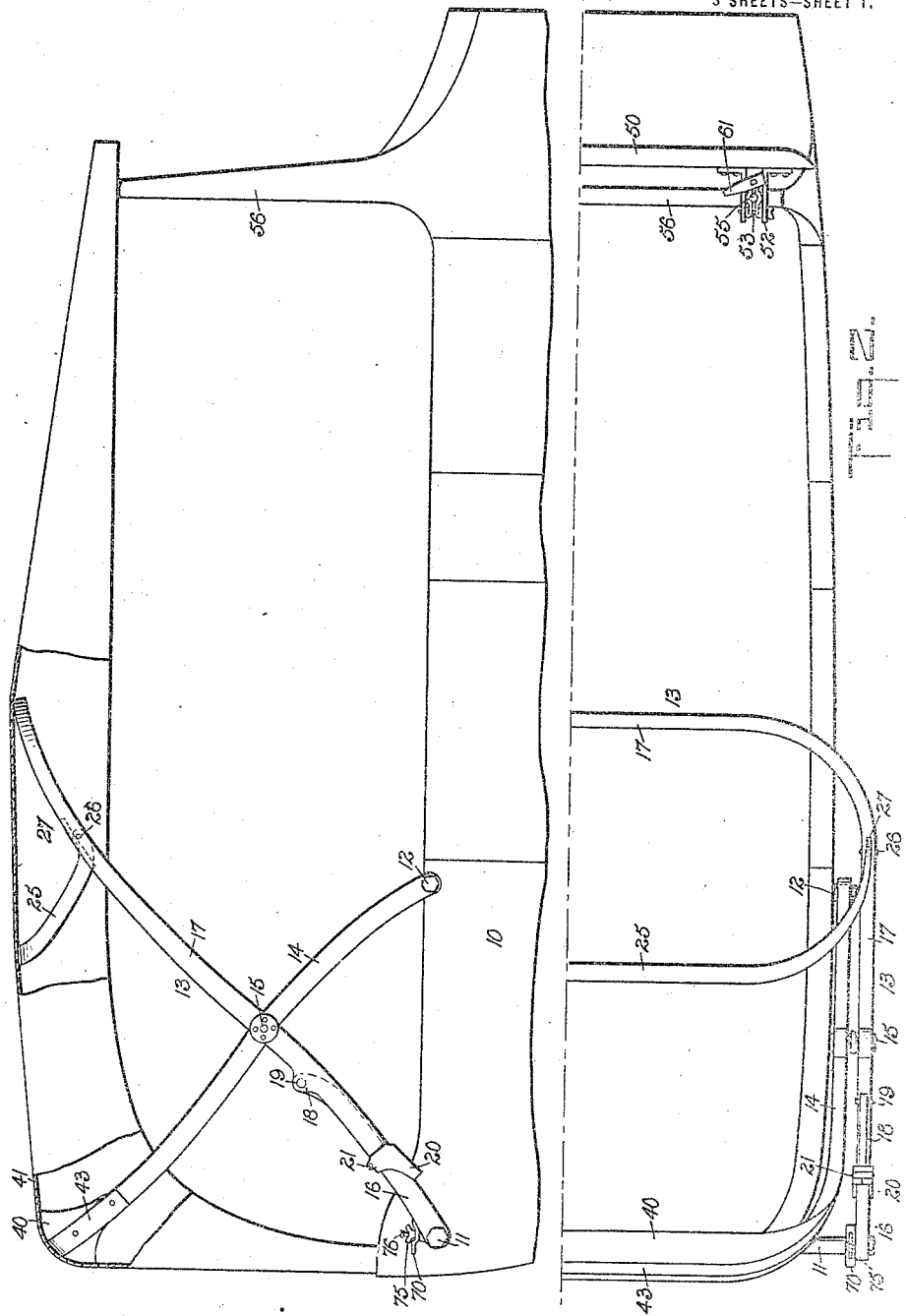

1,294,148.

Patented Feb. 11, 1919.
3 SHEETS—SHEET 3.

WITNESSES

INVENTOR
Doctor F. Oliver
BY
ATTORNEYS

UNITED STATES PATENT OFFICE.

DOCTOR FRANKLIN OLIVER, OF OAKLAND, CALIFORNIA; LILLIE F. OLIVER EXECUTRIX OF D. FRANKLIN OLIVER, DECEASED.

VEHICLE-TOP.

1,294,148.  Specification of Letters Patent.  Patented Feb. 11, 1919.

Application filed February 15, 1917. Serial No. 148,760.

*To all whom it may concern:*

Be it known that I, DOCTOR FRANKLIN OLIVER, a citizen of the United States, and a resident of Oakland, in the county of Alameda and State of California, have invented a new and Improved Vehicle-Top, of which the following is a full, clear, and exact description.

The object of the invention is to provide a new and improved vehicle top more especially designed for use on automobiles and like vehicles and arranged to keep the covering properly stretched, to permit of adjusting the covering and the expansion and contraction thereof, and to permit the operator to easily and quickly raise or lower the top and to keep the rear portion of the top extended over the rear part of the vehicle only, while the front portion is folded up out of the way of the occupants of the vehicle.

In order to accomplish the desired result, use is made of a front bow pivoted on the sides of the vehicle body and extending upwardly and forwardly, the front bow being made in sections, manually controlled means fastening the said sections together, and a rear bow pivoted on the sides of the vehicle body a distance forward of the front bow, the said rear bow extending rearwardly and upwardly, and a pivot connecting the front and rear bows at the point of intersection, the pivot engaging the uppermost section of the front bow a distance from the said locking means.

A practical embodiment of the invention is represented in the accompanying drawings forming a part of this specification, in which similar characters of reference indicate corresponding parts in all the views.

Figure 1 is a side elevation of the vehicle top in closed position on the body of an automobile, parts of the cover being shown broken out;

Fig. 2 is a plan view of the same with the covering removed;

Fig. 3 is a side elevation of the same with the bows in folded position;

Fig. 4 is an enlarged cross section of a portion of the top of the rear bow, parts being shown in elevation;

Fig. 5 is an enlarged sectional side elevation of the same, the section being on the line 5—5 of Fig. 4;

Fig. 6 is an enlarged cross section of the pivotal connection of the front and rear bows;

Fig. 7 is a side elevation of the same;

Fig. 8 is an enlarged plan view of the fastening device for fastening the front crossbar of the covering to the wind shield frame of the vehicle;

Fig. 9 is a side elevation of the same with the covering and its front crossbar shown in section;

Figure 10:
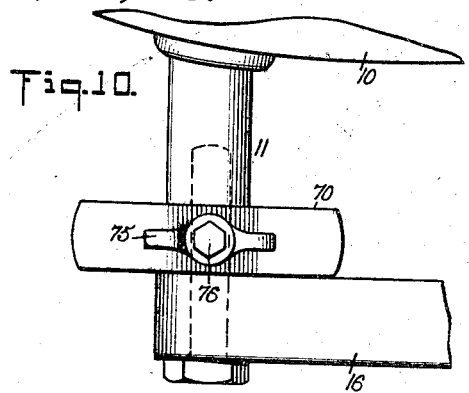
Fig. 10 is a plan view of the pivotal end of the front bow in position on its pivot.

On the sides of the body 10 of an automobile or other vehicle are secured pivots or studs 11 and 12 for the front and rear bows 13 and 14 to swing on. The front bow 13 extends upwardly and forwardly from the rear pivot 11 while the rear bow 14 extends rearwardly and upwardly from the front pivot 12, and the two bows 13 and 14 are connected with each other at their intersection by a pivot 15 to allow the bows to swing one on to the other, as hereinafter more fully explained.

Figure 14:
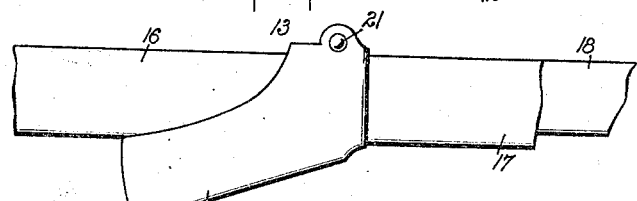
Fig. 14 is a side elevation of the fastening means for fastening the sections of the front bow together.
Figure 15:
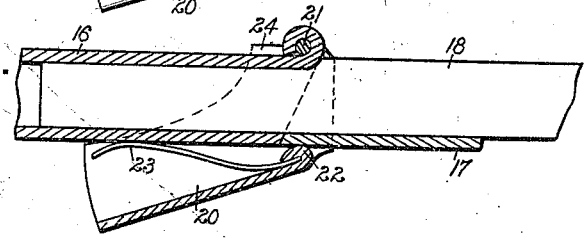
Fig. 15 is a sectional side elevation of the same on the line 15—15 of Fig. 16.
Figure 16:
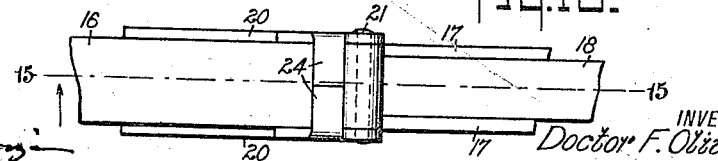
Fig. 16 is a plan view of the same.

The front bow 13 is made of two sections 16 and 17, of which the lower section 16 is fulcrumed on the pivot 11 and the upper section 17 has a miter joint connection with the lower section 16, as will be readily understood by reference to Figs. 14, 15 and 16. In the upper tubular portion of the lower section 16 is secured a shank 18 fitting loosely into the lower trough shaped portion of the upper section 17 and the shank 18 terminates in a transverse pivot pin 19 journaled in the rear face of the upper section 17 for the latter to swing on as a fulcrum on collapsing the lower and upper sections as hereinafter more fully explained. A fastening member 20 normally locks the adjacent ends of the sections 16 and 17 together and this fastening member 20 is fulcrumed at 21 on the upper end of the lower section 16. The fastening member 20 is trough-shaped and its bottom portion is provided at the forward end with a ridge 22 adapted to engage the under side of the upper member 17 to lock the sections 16 and 17 together. A spring 23 is attached to the ridge 22 and bears against the under side of the section 16 to normally hold the fastening member 20 in fastening position. The top of the member 20 is provided with transverse lugs 24 extending across the top of the lower section 16 to limit the downward swinging movement of the fastening member 20. When it is desired to disconnect the sections 16 and 17, the operator presses the fastening member 20 in an upward direction to move the ridge 22 out of engagement with the section 17 thus allowing the latter to separate from the section 16 and its shank 18. The operator now bears down on the lower section 16 thus causing the pivot 19 to impart a swinging motion to the upper section 17, whereby the upper portion of this section 17 is caused to swing rearwardly and the section 16 is swung downward until the sections reach the folded position shown in Fig. 3. It is understood that when the sections 16 and 17 are fastened together by the member 20 the shank 18 provides a reinforcement to render the bow exceedingly strong at the joint of its sections 16 and 17.

The upper section 17 of the front bow 13 is provided with an auxiliary bow 25 extending upwardly and rearwardly and fulcrumed at 26 on the front bow 17. The top of the upper section 17 is cut out a short distance on opposite sides of the pivot 26 to provide a passage for the pivotal end of the auxiliary bow 25 and to provide a rest for the said bow when in the extended position illustrated in Fig. 1 or when in folded position, as shown in Fig. 3.

The pivotal connection 15 previously mentioned consists of cup-shaped sections 30 and 31, of which the section 30 is secured in the upper section 17 of the front bow 13 and the other section 31 is secured in the rear bow 14 (see Figs. 6 and 7). The inner end of the section 30 is enlarged, as indicated at 32, and into the enlargement fits the forward end of the other section 31. The ends of the sections 30 and 31 are connected with each other by a rivet 33 extending centrally through the sections 30 and 31 and the said rivet extends through the opening of a torsion spring 34 having one end 35 secured in one of a series of apertures 36 formed in the outer end of the section 30. The rear end 37 of the spring 34 is secured in one of the apertures 38 formed in the rear end of the section 31. By the arrangement described the sections 30 and 31 can turn one on the other and by the use of the torsion spring 34 the front and rear bows 13 and 14 are counterbalanced and the operator is enabled to easily raise and lower the top. The rear bow 14 is provided with a segmental top 40 over which is stretched the covering 41 fastened at one end to the rear of the vehicle body 10, and then extending upward and over the said top 40, to then extend forwardly over the auxiliary bow 25 and the front bow 13, as plainly indicated in Fig. 1.

The segmental top 40 is preferably of sheet metal (see Figs. 4 and 5), and is provided at its middle with a transversely extending recess 42 filled with a strip 43 of wood to permit of nailing or otherwise fastening the covering 41 to the bow 14. The front end of the covering 41 is attached to a crossbar 50 provided near its end with a bracket 51, preferably formed of two members 52, extending rearwardly, as plainly indicated in Figs. 8 and 9. Between the bracket members 52 is arranged a retaining member 53, preferably made of steel, doubled up and shaped at its middle to form a bearing 54 engaging a pin 55 rising from the top of the wind shield frame 56 of the vehicle. The free ends of the bracket members 52 as well as the free ends of the retaining member 53 are engaged by a screw 57 to permit the bracket members to move on the screw 57 and to allow of drawing the bracket members toward each other to firmly clamp the bearing 54 on the pin 55. The free ends of the retaining member 53 are preferably provided with return bends 58 fitting against the inner faces of the bracket members 52. In the bight of the retaining member 53 is arranged a pivot pin 60 provided on its upper end with a lever 61 adapted to extend across the top of the bracket members 52 to prevent the bracket 51 from swinging upward on the screw 57 as the fulcrum when the lever 61 is swung into longitudinal position, that is, parallel with the bracket members 52, then the crossbar 50 can be swung upward with the bracket members 52 turning on the screw 57 as the fulcrum.

In order to compensate for the expansion and contraction of the covering 41, that is, to take up any slack therein, use is made of a series of apertures 62 formed in the bracket members 52 for engagement by the screw 57 so that the bar 50 can be adjusted further forward or further rearward relative to the retaining member 53 and the fixed pin 55 in case the covering 41 expands or shrinks.

Figure 12:
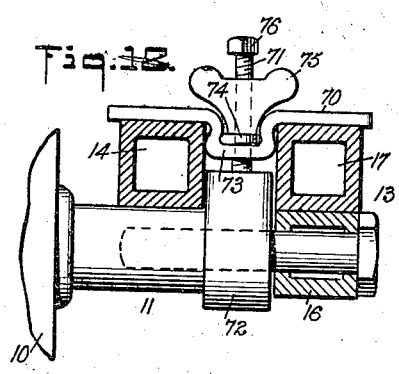
Fig. 12 is an enlarged cross section of the front and rear bows when in folded position on the pivot of the front bow, the section being on the line 12—12 of Fig. 13.
Figure 13:
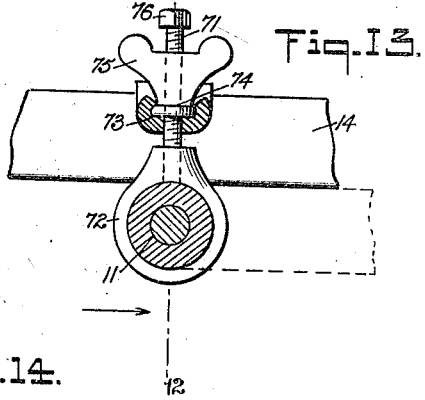
Fig. 13 is a cross section of the said parts at right angles to Fig. 12.

When the vehicle top is in extended position, as shown in Figs. 1 and 2, and it is desired to fold the vehicle top then the operator first swings the lever 61 from the oblique position shown in Fig. 8 into longitudinal position to permit of swinging the crossbar 50 upward and rearward, as indicated in dotted lines in Fig. 9, to slacken the covering 41. The screw 57 is next partly unscrewed to loosen the bearing 54 on the pin 55 and thus permit of lifting the retaining member 53 out of engagement with the pin 55. The operator next presses the fastening member 20 in an upward direction to disengage the ridge 22 from the upper section 17 of the front bow 13 to disengage the upper section 17 from the lower section 16. The upper portion of the bow 17 can now swing rearwardly on the pivotal connection 15 connecting the bow 14 with the upper section 17 of the bow 13, at the same time swinging the bow 14 downward to the position shown in Figs. 3 and 12, that is, until the upper section 17 of the front bow 13 rests on the pivotal end of the section 16 of the front bow 13, and the bow 14 rests on the stud 11 on which the section 16 is pivoted.

Figure 11:
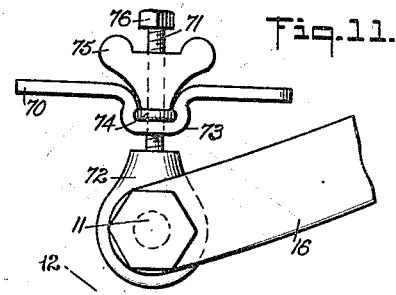
Fig. 11 is a side elevation of the same.

In order to lock the bow sections 16, 17 of the front bow 13 and the rear bow 14 in folded position, use is made of a bar 70 (see Figs. 10, 11, 12 and 13) held on the threaded portion 71 of an eye bolt 72 engaging the stud 11 immediately in the rear of the pivotal end of the front bow section 16. The crossbar 70 is provided at its middle with a bearing 73 engaging a collar 74 formed on a wing nut 75 screwing on the threaded portion 71 of the eye bolt 72. Normally the bar 70 extends in a longitudinal direction, as shown in Figs. 10 and 11, and after the bows have been swung into folded position the bar 70 is turned in a transverse direction to overlie both the rear bows 14 and the upper section 17 of the front bow. By screwing down the nut 75 the bar 70 firmly engages the said bow 14 and the bow section 17, and as the latter overlies the section 16 the bows are securely fastened in folded position. The upper end of the threaded portion 71 of the eye bolt 72 is provided with a head 76 to prevent accidental unscrewing of the nut 75 from the threaded portion 71. It is understood that the covering 41 is rolled up on the crossbar 50, strapped or otherwise secured to the steel portion of the vehicle body 10.

When it is desired to raise the folding top, the crossbar 50 and the casing are unstrapped and then the bar 70 is raised by turning the wing nut 75 to disengage the front bow section 17 and the rear bow 14, after which the bar 70 is turned into the longitudinal position shown in Figs. 2, 10 and 11. The rear bow 14 is now swung upward and with it the upper section 17 of the front bow 13 and then the lower end of the section 17 is engaged with the shank 18 and the fastening member 20 to connect the sections 16 and 17 of the front bow 13 with each other. The bar 50 is now carried forward and the retainer member 53 is engaged with the pin 55, after which the screw 57 is screwed up to firmly clamp the bearing 54 on the pin 55, and then the lever 61 is swung into oblique or transverse position to prevent upward swinging of the bracket 51, as previously explained.

From the foregoing it will be seen that the vehicle top shown and described is comparatively simple and durable in construction and can be readily swung into folded or into extended position, and in either position the bows are securely held in place to prevent the bows from accidentally collapsing when in extended position or from rattling when in folded position.

Having thus described my invention, I claim as new and desire to secure by Letters Patent:—

1. In a vehicle top, a rear bow extending rearwardly and upwardly, a front bow extending forwardly and upwardly and pivoted to the rear bow, the portion of the front bow below the pivot connecting it with the rear bow being formed in sections, the lower section having an extension and the upper section being trough-shaped and to which at a distance from its end the extension of the lower section is pivoted and in which it is adapted to lie, and means for locking the said sections together.

2. In a vehicle top, a rear bow extending rearwardly and upwardly, a front bow extending forwardly and upwardly and pivoted to the rear bow, the portion of the front bow below the pivot connecting it with the rear bow being formed in sections, the upper section being trough shaped and the lower section having a shank extending into the trough-shaped portion of the upper section and having its end pivoted to the same at a distance from the end of the said upper section, and a pivoted trough shaped locking member for locking the sections together.

3. A vehicle top, comprising a front bow pivoted on the sides of the vehicle and extending upwardly and forwardly, the said front bow being made in pivotally connected sections, a spring-pressed locking member pivoted on the free end of one section and engaging the adjacent end of the other section, a rear bow pivoted on the sides of the vehicle in advance of the pivots of the rear bow, the rear bow extending upwardly and rearwardly, a pivot connecting the rear bow with the upper section of the said front bow, the said pivot being made tubular and in sections fixed in the corresponding bows and one turning on the other, and a torsion spring within the tubular pivot and having its ends attached to the outer ends of the pivot sections.

4. A vehicle top, comprising spaced rear and front pivots on the sides of the vehicle, a front bow fulcrumed on the said rear pivot and made in sections, connecting means connecting and disconnecting the said sections of the front bow, a rear bow fulcrumed on the said front pivot, a pivot connecting the said rear bow with the upper section of the said front bow, the said rear bow being adapted to be supported on the said rear pivot and the upper section of the said front bow being adapted to rest on the pivotal end of the lower front bow section at the time the bows are in folded position, and a fastening device held on the said rear pivot for fastening the said folded bows in folded position, the rear bow and the upper section of the front bow lying on opposite sides of the body of the fastening device and over which extends the clamping member of the said device.

5. A vehicle top, comprising a pivoted rear bow extending upwardly and rearward, a pivoted front bow extending upwardly and forwardly across the rear bow, the front bow being formed of an upper and a lower section, the upper section being pivoted to the rear bow, and the lower section having a projecting member pivotally connected with the upper section intermediate of the end of the latter and the pivot connecting it with the rear bow, and a trough shaped pivoted and spring pressed locking member for locking the sections of the front bow.

DOCTOR FRANKLIN OLIVER.

Copies of this patent may be obtained for five cents each, by addressing the "Commissioner of Patents, Washington, D. C."